(12) United States Patent
Betsuno et al.

(10) Patent No.: US 12,153,518 B2
(45) Date of Patent: Nov. 26, 2024

(54) STORAGE DEVICE

(71) Applicant: Hitachi, Ltd., Tokyo (JP)

(72) Inventors: Kenichi Betsuno, Tokyo (JP); Norio Shimozono, Tokyo (JP); Tomohiro Yoshihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 127 days.

(21) Appl. No.: 18/112,675

(22) Filed: Feb. 22, 2023

(65) Prior Publication Data

US 2024/0134789 A1 Apr. 25, 2024
US 2024/0232072 A9 Jul. 11, 2024

(30) Foreign Application Priority Data

Oct. 20, 2022 (JP) ................. 2022-168328

(51) Int. Cl.
*G06F 3/06* (2006.01)
*G06F 12/02* (2006.01)
*G06F 12/08* (2016.01)

(52) U.S. Cl.
CPC .......... *G06F 12/0253* (2013.01); *G06F 12/08* (2013.01); *G06F 2212/702* (2013.01)

(58) Field of Classification Search
CPC .... G06F 3/06; G06F 12/0253; G06F 12/0246; G06F 2212/702; G06F 2212/7204; G06F 2212/7205
See application file for complete search history.

(56) References Cited

U.S. PATENT DOCUMENTS

| 11,429,307 | B2* | 8/2022 | Choi ................... G06F 12/0253 |
| 2007/0055704 | A1* | 3/2007 | Watanabe ............... G06F 3/067 |
| 2020/0057586 | A1 | 2/2020 | Inoue et al. |
| 2020/0073586 | A1 | 3/2020 | Kurata et al. |

FOREIGN PATENT DOCUMENTS

| JP | 2020-035300 A | 3/2020 |
| WO | 2018/020593 A1 | 2/2018 |

* cited by examiner

*Primary Examiner* — Khoa D Doan
(74) *Attorney, Agent, or Firm* — Procopio, Cory, Hargreaves & Savitch LLP

(57) ABSTRACT

Logical hierarchies include an append hierarchy in a storage device. The storage device writes user data received in the append hierarchy to a free area, select a garbage collection operation mode for a first logical area in the append hierarchy from operation modes including first and second operation modes. Conditions of executing the garbage collection in the first operation mode include a capacity of the free area in the append hierarchy being less than a threshold, and an amount of garbage that is invalid data after update in the first logical area being equal to or greater than a threshold. Conditions of executing the garbage collection in the second operation mode include the amount of garbage in the first logical area being equal to or greater than a threshold value, while excluding the condition of the capacity of the free area in the append hierarchy.

10 Claims, 10 Drawing Sheets

HARDWARE CONFIGURATION

HARDWARE CONFIGURATION

FIG. 4

| LOGICAL ADDRESS | PHYSICAL ADDRESS | SIZE BEFORE COMPRESSION | SIZE AFTER COMPRESSION |
|---|---|---|---|
| 0x0100 | 0xA000 | 0x10 | 0x05 |
| 0x0110 | 0xA005 | 0x10 | 0x05 |
| ... | ... | ... | ... |

METADATA MANAGEMENT TABLE

FIG. 5

| PAGE ID | RAID GROUP ID | ADDRESS RANGE IN RAID GROUP | AMOUNT OF GARBAGE | PREVIOUS APPEND POSITION |
|---|---|---|---|---|
| 10 | 20 | 0xA000—0xC000 | 100 | 0x0900 |
| 11 | 21 | 0x0000—0x2000 | 500 | 0x0B00 |
| ... | ... | ... | ... | |

PAGE MANAGEMENT TABLE

FIG. 6

RAID CONFIGURATION MANAGEMENT TABLE (204)

| RAID GROUP ID (2041) | RAID LEVEL (2042) | DRIVE ID (2043) | TYPE OF DRIVE (2044) | LOGICAL CAPACITY (2045) | USED CAPACITY (2046) |
|---|---|---|---|---|---|
| 20 | RAID1 | 0, 1, 2, 3 | QLC SSD | 3000 GB | 500 GB |
| 21 | RAID5 | 4, 5, 6, 7, 8 | TLC SSD | 2500 GB | 1000 GB |
| ... | ... | ... | ... | ... | ... |

FIG. 7

POOL MANAGEMENT TABLE (205)

| POOL ID (2051) | RAID GROUP ID (2052) | POOL CAPACITY (2053) | POOL USED CAPACITY (2054) | GC OPERATION MODE (2055) |
|---|---|---|---|---|
| 100 | 20 | 1000 GB | 400 GB | LIFETIME PRIORITY |
| 101 | 20 | 2000 GB | 1900 GB | PERFORMANCE PRIORITY |
| ... | ... | ... | ... | ... |

GARBAGE COLLECTION EXECUTION DETERMINING PROCESS

OPERATION MODE SELECTION SCREEN

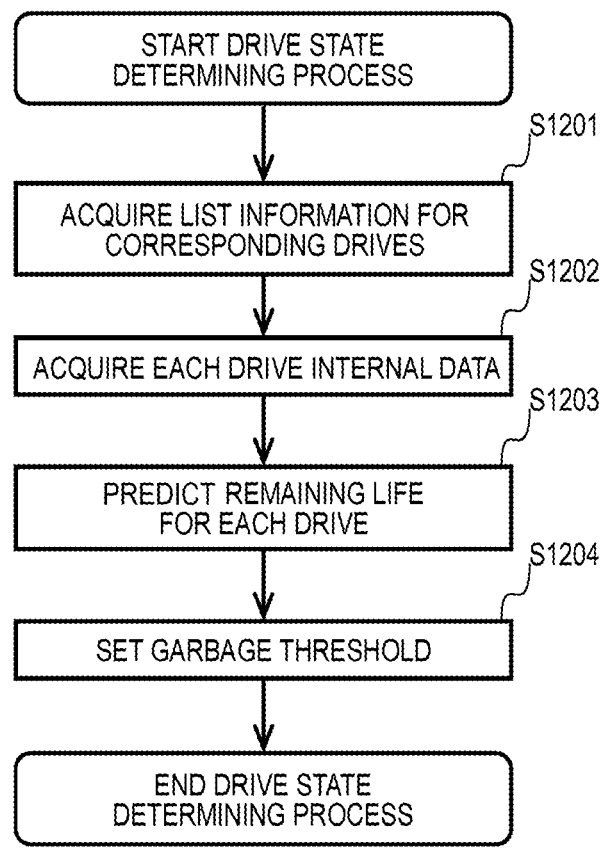
DRIVE STATE DETERMINING PROCESS

STORAGE DEVICE

CLAIM OF PRIORITY

The present application claims priority from Japanese patent application JP2022-168328 filed on Oct. 20, 2022, the content of which is hereby incorporated by reference into this application.

BACKGROUND OF THE INVENTION

1. Field of the Invention

The present invention relates to a garbage collection process in a storage device.

2. Description of Related Art

Data reduction technologies such as data compression technology and deduplication technology are widely used as a means for reducing cost of storage medium of a storage system. When applying these data reduction technologies, there is difference between the size of data written from the host to the storage system and the size of data actually written to the storage medium. Therefore, in order to efficiently use a storage area of the storage medium, an append type data storage method (e.g., Log-Structured Storage) is used, in which the data after data reduction is written to the free area sequentially from the front.

According to the append data storage method, when data is updated, access to the data before update (valid data) is not available. The data in this state is called garbage (invalid data). As the host repeatedly updates data and the storage system continues to add data, the amount of garbage increases and free area decreases. The free area is an area in which valid data before update or garbage which is invalid data after update is not stored.

Therefore, when the append data storage method is used, in order to delete the generated garbage, a method is used, which calculates the percentage of garbage included in a predetermined storage area as an invalidation ratio, and performs the garbage collection when the invalidation ratio exceeds a preset invalidation ratio threshold. The garbage collection is a process of copying valid data to another free area and then freeing up a predetermined storage area so that it can be reused. For example, WO2018/020593 describes one example.

Further, a method may be employed, which performs garbage collection when the sum of used capacity of SSD and the amount of garbage equals to or greater than a certain value or when free capacity equals to or less than a certain value. For example, JP2020-035300A describes one example.

The garbage collection process involves a process of copying recorded valid data to another free area of a storage medium (hereinafter, "drive"). This copying process generates data writes to the drive, wasting lifetime of the drive. For example, a flash memory device has a rewrite lifetime. As the rewrite is performed on the same element, degradation continues. When exceeding an upper limit of the number of rewrites, the probability of the read and write being impossible increases.

Meanwhile, in order for the garbage collection process to be executed, it is necessary to use the resources of the storage system (e.g., CPU bandwidth and drive bandwidth), and this deteriorates the performance of the other processes consuming resources of the storage system (e.g., I/O process of an external device). Therefore, for the storage system that requires high I/O performance, it is necessary to reduce the impact of the garbage collection process on I/O performance.

SUMMARY OF THE INVENTION

According to an aspect of the present invention, a storage device that manages data stored in a storage drive in a plurality of logical hierarchies may include a host interface for communicating with a host, and a processor, in which the plurality of logical hierarchies may include an append hierarchy, the processor may be configured to write user data received in the append hierarchy through the host interface to a free area where data can be written, and select a garbage collection operation mode for a first logical area in the append hierarchy from a plurality of operation modes including a first operation mode and a second operation mode, conditions of executing the garbage collection in the first operation mode may include a capacity of the free area in the append hierarchy being less than a threshold, and an amount of garbage that is invalid data after update in the first logical area being equal to or greater than a threshold, conditions of executing the garbage collection in the second operation mode may include the amount of garbage in the first logical area being equal to or greater than a threshold value, while excluding the condition of the capacity of the free area in the append hierarchy, and the garbage collection may select valid data before update from the first logical area, and copy the selected valid data to another logical area in the append hierarchy, freeing up the first logical area.

According to an aspect of the present invention, it is possible to enhance I/O performance in a storage device while preventing waste of lifetime of the drive.

BRIEF DESCRIPTION OF THE DRAWINGS

FIG. 4 is a view showing a metadata management table according to an embodiment;

FIG. 5 is a view showing a page management table according to an embodiment;

FIG. 6 is a view showing a RAID configuration management table according to an embodiment;

FIG. 7 is a view showing a pool management table according to an embodiment;

FIG. 12 is a view showing a drive state determining process according to an embodiment.

DESCRIPTION OF EMBODIMENTS

Figure 1:
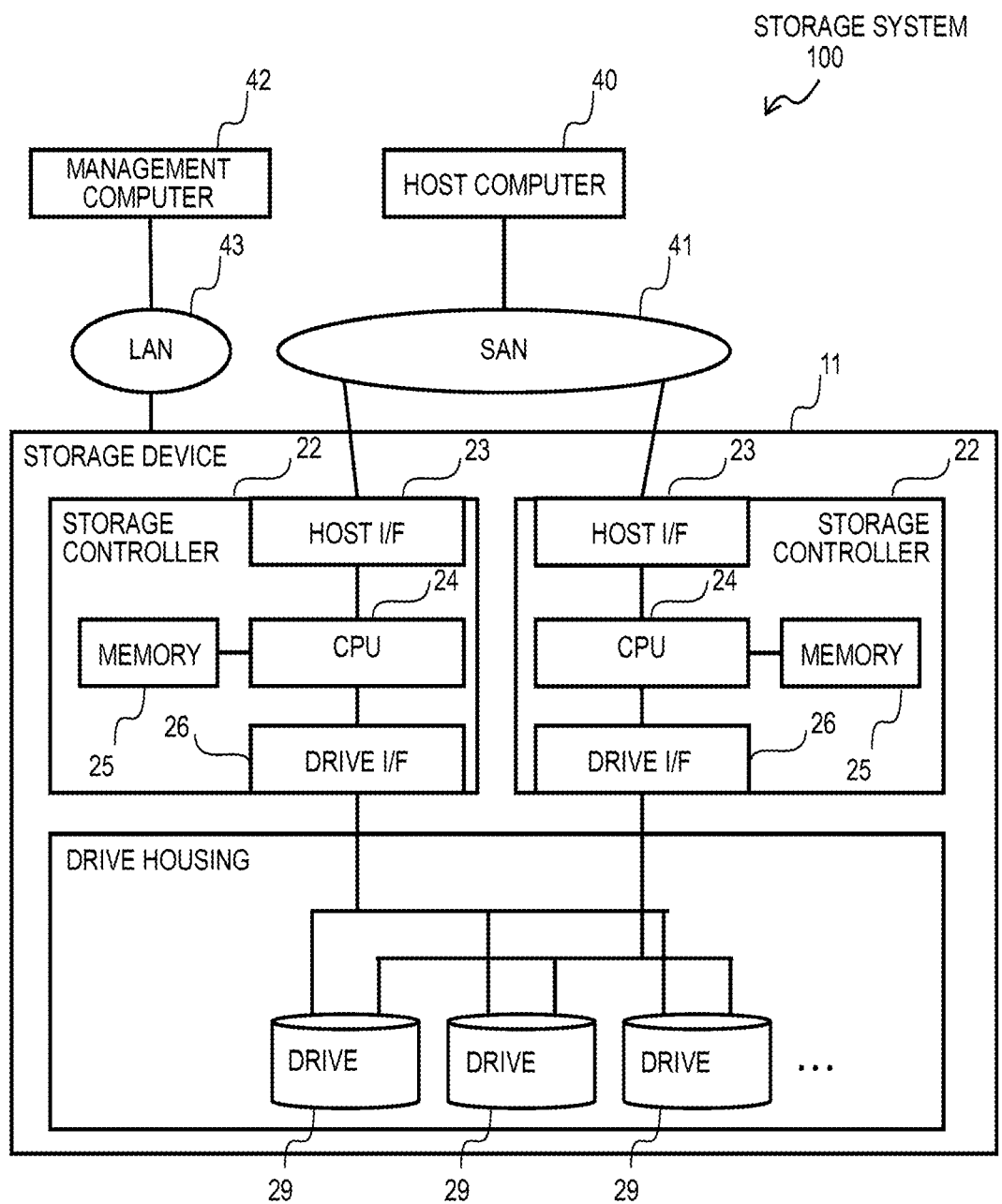
FIG. 1 is a view showing a hardware configuration of a storage system according to an embodiment.

Hereinafter, an embodiment of the present invention will be described by referring to the drawings. In the accompanying drawings, functionally identical elements may be identified with the same reference numerals. The accompanying drawings illustrate specific embodiments and examples complying with the principles of the present invention. Embodiments and examples are provided for understanding of the invention and should not be used for limiting the interpretation of the invention.

Further, in the following description, when describing a same type of elements without distinguishing them, common numerals next to reference numerals may be used, and when distinguishing a same type of elements, reference numerals (or element IDs (e.g., identification number)) may be used. For example, a plurality of pages may be referred to as "page 70" when it is not necessary to distinguish the pages, or referred to as "page 70A" and "page 70B" when it is necessary to distinguish the pages. The other elements are referred to in the same manner.

First Embodiment

According to a first embodiment, the storage device employs an append type data storage method. FIG. 1 is a schematic view showing a storage system 100 according to the first embodiment. The storage system 100 includes a storage device 11, a host computer 40 connected to the storage device 11, and a management computer 42 connected to the storage device 11.

The storage device 11 receives I/O commands from one or more host computers 40 through a first communication network 41 (e.g., Storage Area Network (SAN)). The management computer 42 and the storage device 11 may communicate with each other through a second communication network 43 (e.g., Local Area Network (LAN)).

The host computer 40 and the management computer 42 may be physical computers or virtual computers implemented on the physical computers. The storage device 11 includes one or more storage controllers 22 and a plurality of storage drives 29 (also simply referred to as the "drives") connected to the one or more storage controllers 22. In the configuration example of FIG. 1, the storage device 11 includes two storage controllers 22.

Each storage controller 22 includes a host interface (I/F) 23 for communicating with the host computer 40, a CPU 24 for controlling the entire device, a memory 25 for storing programs and information used by the CPU 24, and a drive I/F 26 for communicating with a physical drive 29. Any number of these elements may be used. In the configuration example shown in FIG. 1, a plurality of drives 29 are received in a drive housing. For example, the drives 29 are devices having a non-volatile data storage medium, and may be SSDs (Solid State Drive) or HDDs (Hard Disk Drive).

Figure 2:
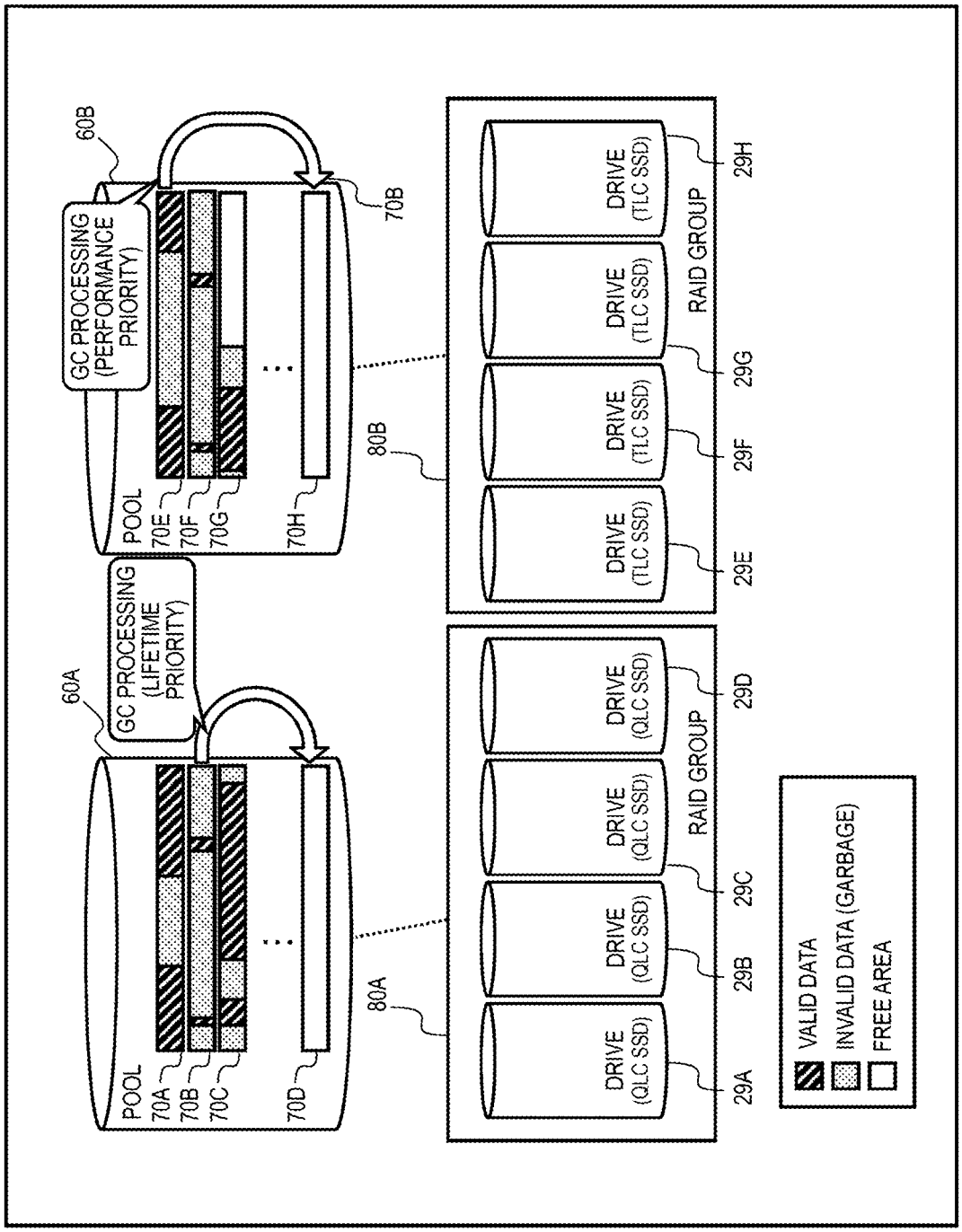
FIG. 2 is a view showing an overview of executing garbage collection corresponding to a type of a drive according to an embodiment.

FIG. 2 is a view showing an overview of the process according to an embodiment in the specification. A plurality of drives form one Redundant Arrays of Inexpensive Disks (RAID) group. In the configuration example of FIG. 2, drives 29A to 29D form an RAID group 80A, and drives 29E to 29H form an RAID group 80B.

In the configuration example of FIG. 2, the drives 29A to 29D are relatively lower endurance drives (e.g., QLC SSDs in the drawing), and the drives 29E to 29H are relatively higher endurance drives (e.g., TLC SSDs in the drawing). The endurance herein means lifetime writes, and higher endurance means that more counts of writes are possible.

A pool 60 is a logical storage area for storing data. The storage area of the pool 60 is allocated in units of pages 70 which are logical storage areas. The page 70 is a logical area and is uniquely allocated to the storage area of one RAID group 80. Although the page size is constant in the following description, it does not have to be constant.

In the example of FIG. 2, pages including the pages 70A to 70D are allocated to the pool 60A and pages including the pages 70E to 70H are allocated to the pool 60A. Further, the valid data of each page is represented by a diagonal line pattern, the invalid data (garbage) is represented by a dot pattern, and the free area is represented by a blank. For example, a page 70G stores valid data and garbage. The page 70G also includes an area (the free area) where neither valid data nor garbage is stored.

Referring to FIG. 2, a flow of a process of collecting garbages in the pools 60A and 60B will be described. The CPU 24 determines the endurance of corresponding drives 29 by referring to the type of the drives to which the storage areas of the pool 60A and the pool 60B are allocated (the drives 29 forming the RAID group 80 corresponding to the pool 60, when the drives 29 form the RAID group 80). The garbage collection process, which will be described below, is controlled based on the result of this determination.

For example, in the case of SSD designed from NAND flash memory, the method for determining the endurance for each type of drive may include determining the type based on the number of bits per cell. The NAND flash memory tends to have a larger capacity as the number of bits that can be stored per cell increases, but its endurance tends to be lower. Examples of the type of a low endurance drive include QLC SSD, PLC SSD, and the like. Examples of the type of a high endurance drive include MLC SSD, TLC SSD, and the like.

Another example of the method for determining endurance of a drive may include the use of an endurance index published by a manufacturer. For example, Drive Writes Per Day (DWPD), which is an index indicating the amount of data that can be written per day during a warranty period of the drive may also be used. The CPU 24 can obtain the DWPD from each drive 29.

As in the two methods described above, drive endurance can be determined based on the specification (attributes) of the drive. The low endurance may be determined when the drive specification meets predetermined low endurance conditions. The high endurance may be determined when the drive specification meets predetermined high endurance conditions. A drive not matching the low endurance condition may be determined to be high endurance. The CPU 24 may determine the type of the drive based on the specification of the drive. The endurance (high endurance or low endurance) is associated with the type of the drive type.

When the CPU 24 determines that the endurance of the drive 29 corresponding to the pool 60 is low, the CPU 24 performs garbage collection after accumulating garbage as much as possible, thereby reducing frequency of generating copies of valid data between the pages 70 and preventing consumption of lifetime of the drive 29.

Specifically, in FIG. 2, when the CPU 24 determines that endurance of the drives 29A to 29D is low based on the type (QLC SSD) of the drives 29A to 29D forming the pool 60A, garbage collection is not performed (i.e., it stops) until free capacity of the pool 60A falls to or below a predetermined threshold. After the free capacity falls to or below the predetermined threshold, garbage collection is performed on the page 70B of the pages 70 in the pool 60A, which includes a predetermined amount of garbage or more.

Meanwhile, when the CPU 24 determines that endurance of the drive 29 forming the pool 60 is high, the CPU 24 actively performs garbage collection without accumulating garbage, and actively secures free capacity in the pool 60 in advance, so as to perform operation for enhancing the processing performance with respect to I/O from the host computer.

Specifically, in FIG. 2, when determining that the drives 29E to 29H are high endurance based on the type (TLC SSD) of the drives 29E to 29H forming the pool 60B, regardless of free capacity of the pool 60B, the CPU 24 performs garbage collection on the page 70E of the page 70 in the pool 60B, which includes at least the predetermined amount of garbage.

The free capacity threshold of the pool for garbage collection may be, for example, a value of free capacity itself or may be expressed by a ratio of free capacity to pool capacity. The predetermined amount (the threshold value) of the garbage amount as a basis for determining whether to execute garbage collection may also be the garbage amount itself or may be expressed by the ratio of the garbage amount to page capacity.

<Logical Configuration>

Figure 3:
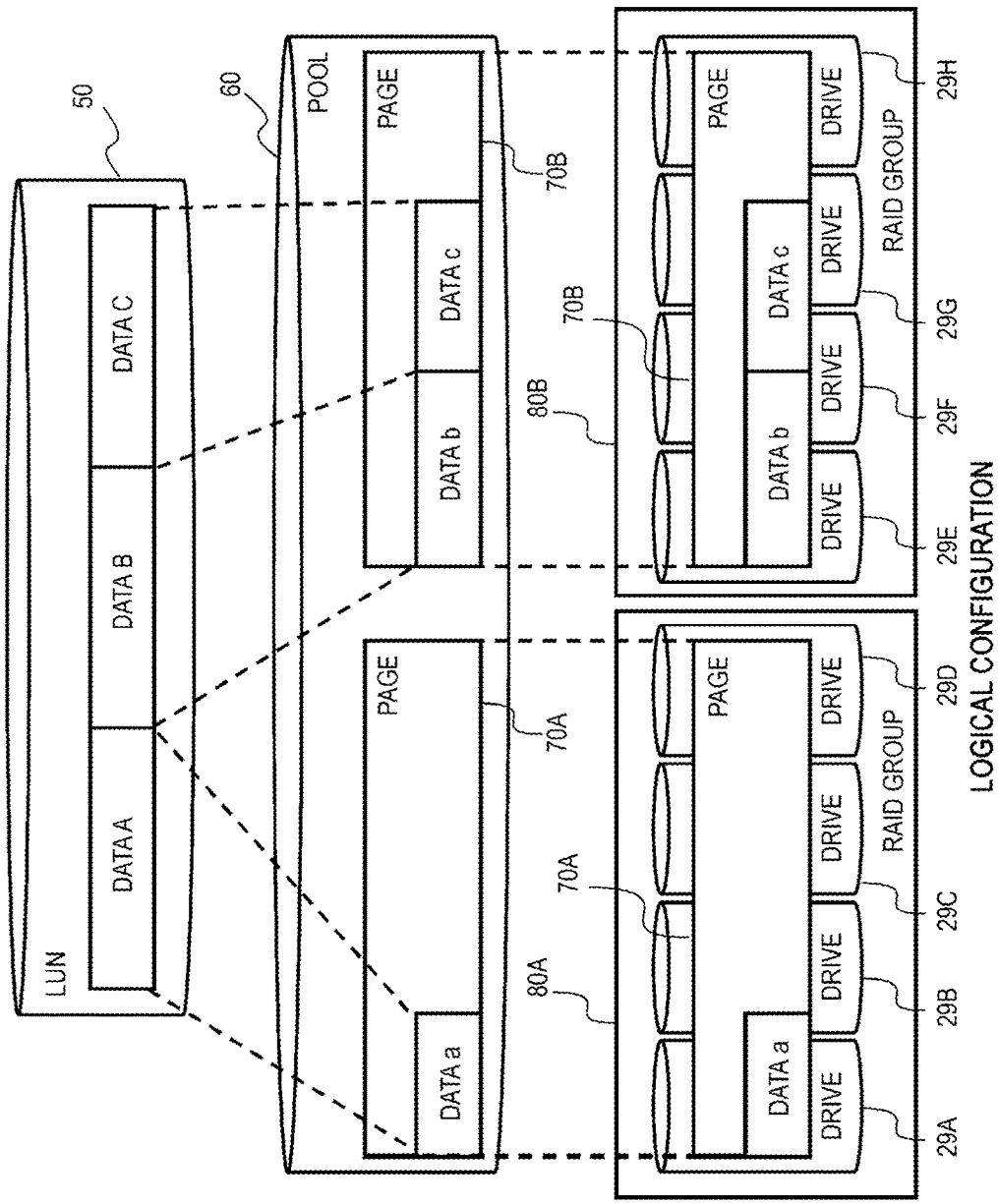
FIG. 3 is a view showing a logical configuration according to an embodiment.

FIG. 3 is a view showing a logical configuration of the storage according to an embodiment. LUN 50 is a logical drive recognized by the host computer 40, and a host I/O is executed with respect to a logical address space on the LUN 50.

The pool 60 is a logical storage area (also simply, logical area) linked to one or more LUNs 50 and one or more RAID groups 80. According to an embodiment, user data stored on the LUN 50 may be compressed and/or deduplicated, and stored in the pool 60. For example, data A, data B, and data C in the LUN 50 are respectively compressed to generate data a, data b, and data c and stored in the pool 60. The data a may be stored in the page 70A, and the data b and the data c may be stored in the page 70B. Note that a data reduction process such as a compression/deduplication process will not be described.

The pool 60 is managed by the page 70. The page 70 is a unit area that manages the pool 60 and is associated with a logical storage area within the RAID group 80. In each page 70, the post-compression data may be arranged sequentially from the front. Therefore, data can be stored efficiently.

In both update write and new write by the host computer 40, the received user data may be stored from the front of the free area within the page 70. When the present user data is updated by the host computer 40, new user data is stored from the front of the free area within the page 70, and the old user data, which are originally stored, becomes garbage.

The page 70 is a logical storage area for storing data. The page 70 is associated with a logical storage area within RAID group 80 including a plurality of drives 29. In the configuration example of FIG. 3, the page 70A within the pool 60 is allocated to the RAID group 80A, and the page 70B is allocated to the RAID group 80B.

The RAID group 80 includes a plurality of drives 29. By combining a plurality of drives 29 to construct a logical storage medium, redundancy is secured even when a drive in the RAID group 80 has failures. The logical storage area of RAID group 80 is associated with a physical storage area of the drive 29.

As shown in FIG. 3, the logical storage configuration has a hierarchical structure, and the storage device 11 manages data in a plurality of logical hierarchies. FIG. 3 illustrates a hierarchy of the LUN 50, a hierarchy of RAID group 80, and a hierarchy of the pool 60 between them. The hierarchy of the pool 60 is an append hierarchy in which user data received through the host interface 23 is written to the free area. Although FIG. 3 illustrates one LUN 50 and one pool 60, a plurality of LUNs and a plurality of pools can be defined in the storage device 11. Storage areas in a hierarchy are associated with storage areas in an adjacent upper and/or lower hierarchy. Although FIG. 3 illustrates three logical hierarchies, other hierarchies can be defined.

<Metadata Management Table>

FIG. 4 is a view showing a metadata management table 202 according to an embodiment. The CPU 24 forms a metadata management table 202. The metadata management table 202 may be managed by the CPU 24, and, for example, may be stored in the drive 29 and loaded into the memory 25. The metadata management table 202 may be managed based on a unit of LDEV 50, for example. Each entry in the metadata management table 202 is a table for managing the correspondence relations between the logical address of user data in each of LDEV 50 and the physical address where corresponding data is stored. The physical address may be an address within the RAID group 80 or an address within the pool 60.

Hereinbelow, each column of the metadata management table 202 will be described.

A column 2021 records a start address of an address range within the corresponding LDEV 50.

A column 2022 records a start address of an address range within the RAID group 80 as an address of a user data storage area address. For convenience of explanation, an address within the RAID group 80 may be called a physical address for convenience. Further, instead of the address within the RAID group, an address within the pool 60 may be used as the address of the user data storage area.

A column 2023 records a data size of the corresponding user data before compression.

A column 2024 records a data size of the corresponding user data after compression.

<Page Management Table>

FIG. 5 is a view showing a page management table 203 according to an embodiment. The CPU 24 forms the page management table 203. The page management table 203 is managed by the CPU 24, and, for example, may be stored in the drive 29 and loaded into the memory 25. Each entry in the page management table 203 records correspondence relations including a page 70 which is a logical recording area, an ID of the RAID group 80 corresponding to the page 70, and an address range corresponding to the page 70 within the RAID group 80. Further, the amount of garbage in the corresponding page 70 and an end address (previous append address) at which append is performed lastly within the page are recorded.

Hereinbelow, each column of the page management table 203 will be described. A column 2031 records an ID indicating the page 70. A column 2032 records an ID indicating the RAID group 80 to which the page 70 is allocated. A column 2033 records an address range within the RAID group 80 corresponding to the page 70. A column 2034 records an amount of garbage in the page 70.

A column 2035 records a position (end address) in the page 70 where data is lastly written. The append process is performed sequentially from the front, starting from a head address of the page 70. Therefore, an area after the end address is an area where any data is not stored (i.e., data writable).

<RAID Configuration Management Table>

FIG. 6 is a view showing an RAID configuration management table 204 according to an embodiment. The RAID configuration management table 204 is managed by the CPU 24, and, for example, may be stored in the drive 29 and loaded into the memory 25. The RAID configuration management table 204 is a data structure that records, for each RAID group 80 in the storage system, an RAID level of the corresponding RAID group 80, a list of IDs corresponding to the drives 29 belonging to the corresponding RAID group 80, and types of the drives forming the corresponding RAID group 80, a logical capacity of the corresponding RAID group 80, and a used capacity of the corresponding RAID group 80.

Hereinbelow, each column of the RAID configuration management table 204 will be described. A column 2041 records the IDs of the RAID groups 80 in the storage system 100. A column 2042 records the RAID level (e.g., RAID1, RAID5, etc.) of the corresponding RAID group 80. A column 2043 records the list of drive IDs belonging to the corresponding RAID group 80.

A column 2044 records the types of drives (e.g., HDD, QLC SSD, TLC SSD, etc.) belonging to the corresponding RAID group 80. A column 2045 records the logical capacity of the corresponding RAID group 80. A column 2046 records the used capacity of the corresponding RAID group 80. The used capacity is a total size of areas used for storing data (for example, user data and metadata) in the corresponding RAID group 80.

The CPU 24 obtains the RAID level from a user and stores the obtained RAID level in the column 2042. The CPU 24 may obtain a drive ID from the user and store the same, or may generate and store the drive ID. When the CPU 24 generates the drive ID, the CPU 24 may uniquely determine the drive ID based on the physical location of the drive 29. The information of the other columns may be generated and stored by the CPU 24. For example, the CPU 24 may determine the drive type based on the specification information obtained from the drive 29 and store the determined result in the column 2044.

<Pool Management Table>

FIG. 7 is a view showing a pool management table 205 according to an embodiment. The pool management table 205 is created and managed by the CPU 24, and, for example, may be stored in the drive 29 and loaded into the memory 25. The pool management table 205 is data structure for recording, for each pool in the storage system 100, an ID of the pool 60, a list of IDs of RAID group 80 corresponding to the pool 60, a logical capacity of the pool 60, and a used capacity of the pool 60, and a garbage collection (GC) operation mode in the pool.

Hereinbelow, each column of the pool management table 205 will be described. A column 2051 records the ID of the pool 90 in the storage system 100. A column 2052 records the list of IDs of RAID group 80 which provides pages to the corresponding pool 60. One or more RAID groups are allocated to one pool. For example, it is assumed that the RAID groups allocated to one pool have a common drive type. A column 2053 records the logical capacity of the corresponding pool 60.

A column 2054 records the used capacity of the corresponding pool 60. The used capacity is a total size of areas used for storing data (for example, user data, metadata) in the pool 60.

A column 2055 records a GC operation mode in the corresponding pool 60. According to an embodiment, the GC operation mode is divided into two types, which are a "performance priority" that is a mode (a second operation mode) that prioritizes I/O performance, and a "lifetime priority" that is a mode (a first operation mode) that prioritizes protection of lifetime of the drive. The CPU 24 determines the GC operation mode according to a result of the determination of endurance of the drives forming the pool. When the drives are determined to be the low endurance drives, the lifetime priority mode is determined for the pool. When the drives are determined to be the high endurance drives, the performance priority mode is determined for the pool.

In this example, the CPU 24 determines the GC operation mode according to the type of the drives forming the pool. The drive type is shown in the column 2044 of the RAID configuration management table 204. In this example, the lifetime priority mode is determined for the pool of QLC SSD, and the performance priority mode is determined for the pool of TLC SSD. Thus, in the storage device 11, QLC SSD is defined as the low endurance SSD, and TLC SSD is defined as the high endurance SSD.

Based on the GC operation mode as set, the CPU 24 switches internal processes such as a garbage collection process and a garbage collection process execution determining process which will be described below.

<Write Process>

Figure 8:
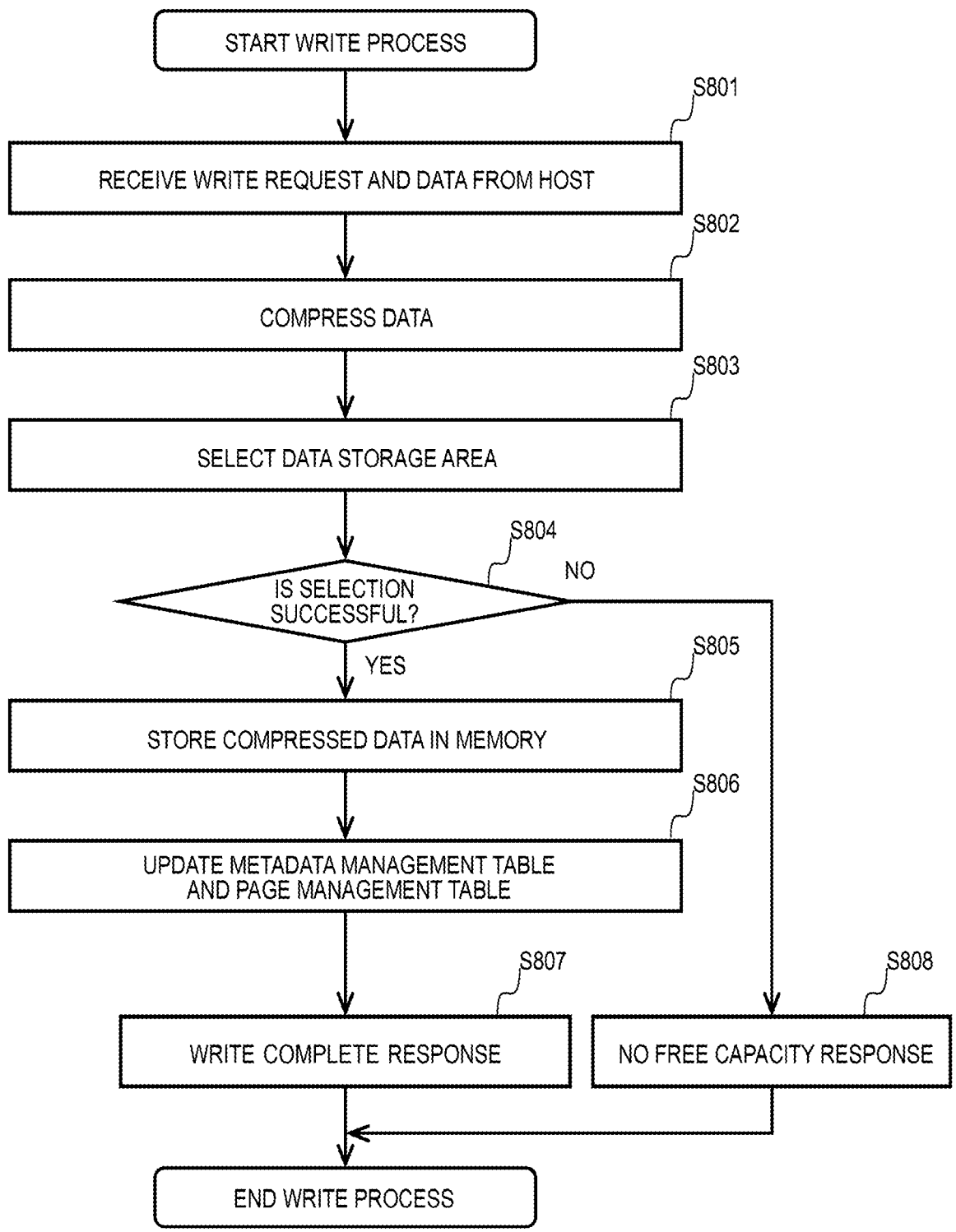
FIG. 8 is a view showing a write process according to an embodiment.

FIG. 8 is a view showing a flow of a write process according to an embodiment. The write process is a process of receiving a write request from the host computer 40 and recording data in the storage device 11. In the write request, for example, the LUN ID and logical address of a write destination are designated by the host computer 40.

The flow of the write process according to an embodiment will be described below by referring to FIG. 8.

S801: the CPU 24 receives a data write request and data from the host computer 40.

S802: the CPU 24 applies a compression process to the data received from the host computer 40 to obtain compressed data. This compression process may be performed by the CPU 24 itself, or when the storage device 11 includes hardware capable of performing the compression process, the compression process may be performed by the corresponding hardware.

S803: the CPU 24 selects a destination page 70 for storing the compressed data. The CPU 24 refers to the page management table 203, the RAID configuration management table 204 and the pool management table 205. The size spanning from the last append position of the page to the end of the page is set to be the free area in the page, and the page 70 whose free area in the page is larger than the size of the compressed data is selected as the data storage destination.

S804: when the CPU 24 can select a page that satisfies the conditions at S803 as a data storage destination page, the CPU 24 moves to S805. When there is no page that satisfies the conditions, the CPU 24 moves to S808.

S805: the CPU 24 stores the compressed data in the memory 25.

S806: the CPU 24 updates each of values of the physical address 2022 corresponding to the page ID 2021 in the metadata management table 202 and the logical address 2021 in the page, the size information 2023 before compression, and the size information 2024 after the compression. Further, in the case of update write, the CPU 24 increases the value of the garbage amount 2034 corresponding to the page 70 storing the data before update in the page management table 203 by the size of the data before update. Accordingly, the amount of data to be garbage is managed. Further, a value of the previous append position 2035 is updated to a value of the append position where the current compressed data is stored.

S807: the CPU 24 returns a write process completion response to the host computer 40, and ends the process.

S808: the CPU 24 returns, to the host computer 40, a response indicating that the write process is failed due to insufficient free capacity, and ends the process.

With respect to the description of FIG. 8, the compression process may be performed before the write process completion response to the host computer 40, but the compression process may be performed asynchronously with the write process. For example, after the data received from the host computer 40 is stored in the memory 25, and after the write process completion response is sent to the host computer 40, the compression process may be performed asynchronously on the data in the memory 25.

<Garbage Collection Process>

Figure 9:
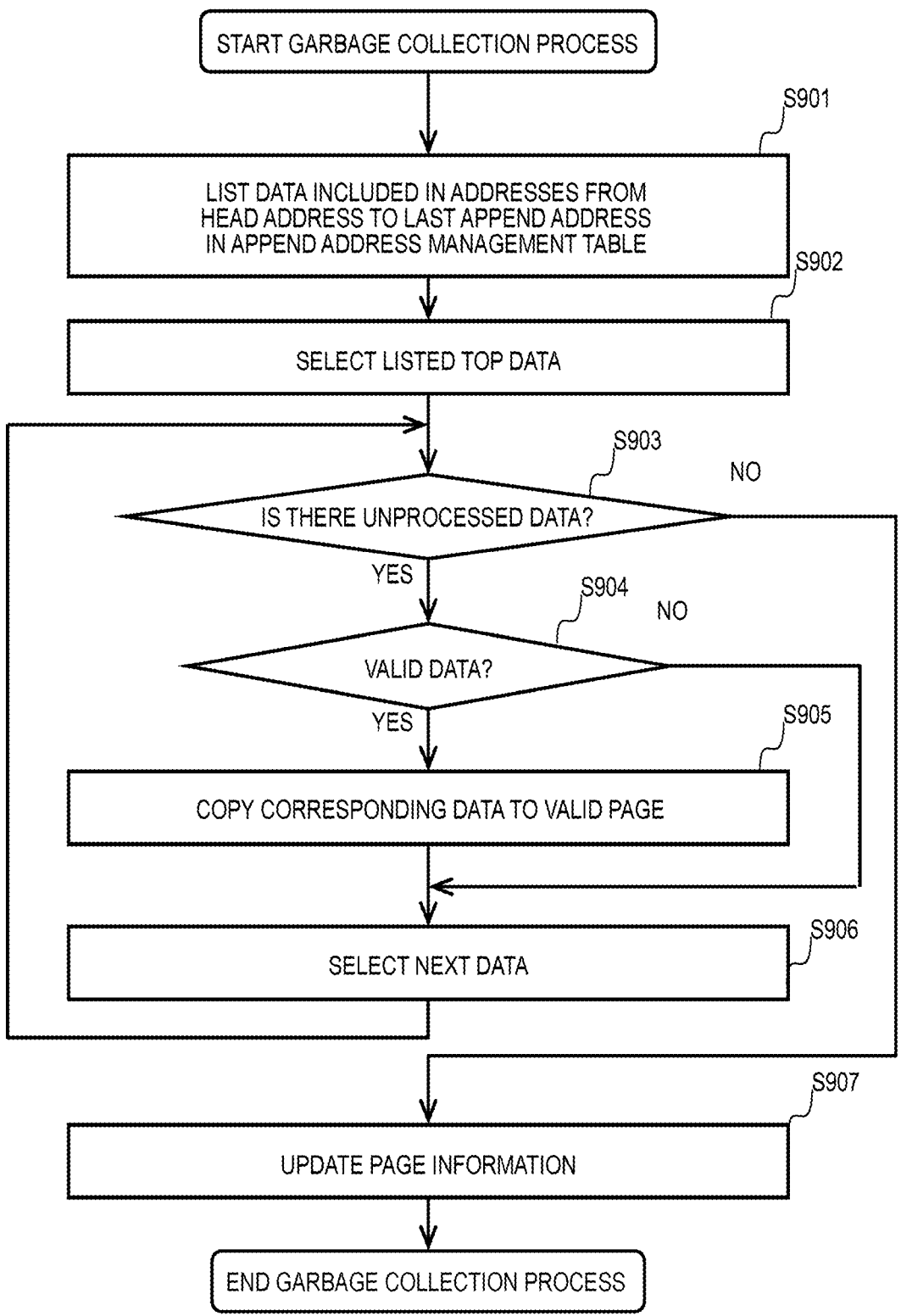
FIG. 9 is a view showing a garbage collection process according to an embodiment.

FIG. 9 is a view showing a flow of a garbage collection process according to an embodiment. The garbage collection process is a process of moving only the valid data of the target page 70 including the valid data and the garbage to another page, and then discarding the target page 70, thus freeing up the storage area once occupied by the garbage so that it can be reused.

The CPU 24 performs the garbage collection process on the storage area (e.g., page 70) that is determined to be a target for the garbage collection process in the garbage collection process execution determining process which will be described below.

The CPU 24 may periodically perform the garbage collection on the pages 70 determined to be a target for the garbage collection, or may perform the garbage collection synchronously or asynchronously with the write process, in response to the increasing the amount of garbage in the page 60 or the page 70 by the write process.

Further, the garbage collection process may also be performed when the logical configuration in the storage system 100 is changed. For example, the garbage collection process may be implemented when the size of the LUN 50, LDEV, the pool 60, or RAID group 80 is changed.

Further, the garbage collection process may be implemented when the physical configuration in the storage system 100 is changed. For example, the garbage collection process may be implemented in the case of addition or reduction of the drive 29.

Hereinbelow, a flow of the garbage collection process according to an embodiment will be described with reference to FIG. 9.

S901: by referring to the page management table 203, the CPU 24 lists the data included in an address range from the head address of the target page to the previous append position.

S902: the CPU 24 selects top data from the listed data as a processing target at 51101.

S903: the CPU 24 determines whether there remains unprocessed data in the data listed at S901. When there remains unprocessed data (S903: YES), the CPU 24 moves to S904. When there is no remaining unprocessed data (S903: NO), the CPU 24 moves all of the valid data included in the page 70 to another page 70, and ends the garbage collection process.

S904: the CPU 24 determines whether the target data is valid, by referring to the physical address information 2022 and the logical address information of the metadata management table 202. When there is a logical address corresponding to the physical address where the target data is located, the target data is determined to be valid. Otherwise, the target data is determined to be invalid data. When the data is valid (S904: YES), the CPU 204 moves to S905. When the data is not valid (S904: NO), the CPU 204 moves to S906.

S905: the CPU 24 copies the target data to another page 70 in the pool 60.

S906: the CPU 24 selects next data from the data listed at S1201, and moves to S1203.

S907: by referring to the page management table 203, the CPU 24 rewrites a value of the garbage amount 2034 and a value of the previous append position 2035, among the entries corresponding to the target page 70, to initial values.

<Garbage Collection Execution Determining Process>

Figure 10:
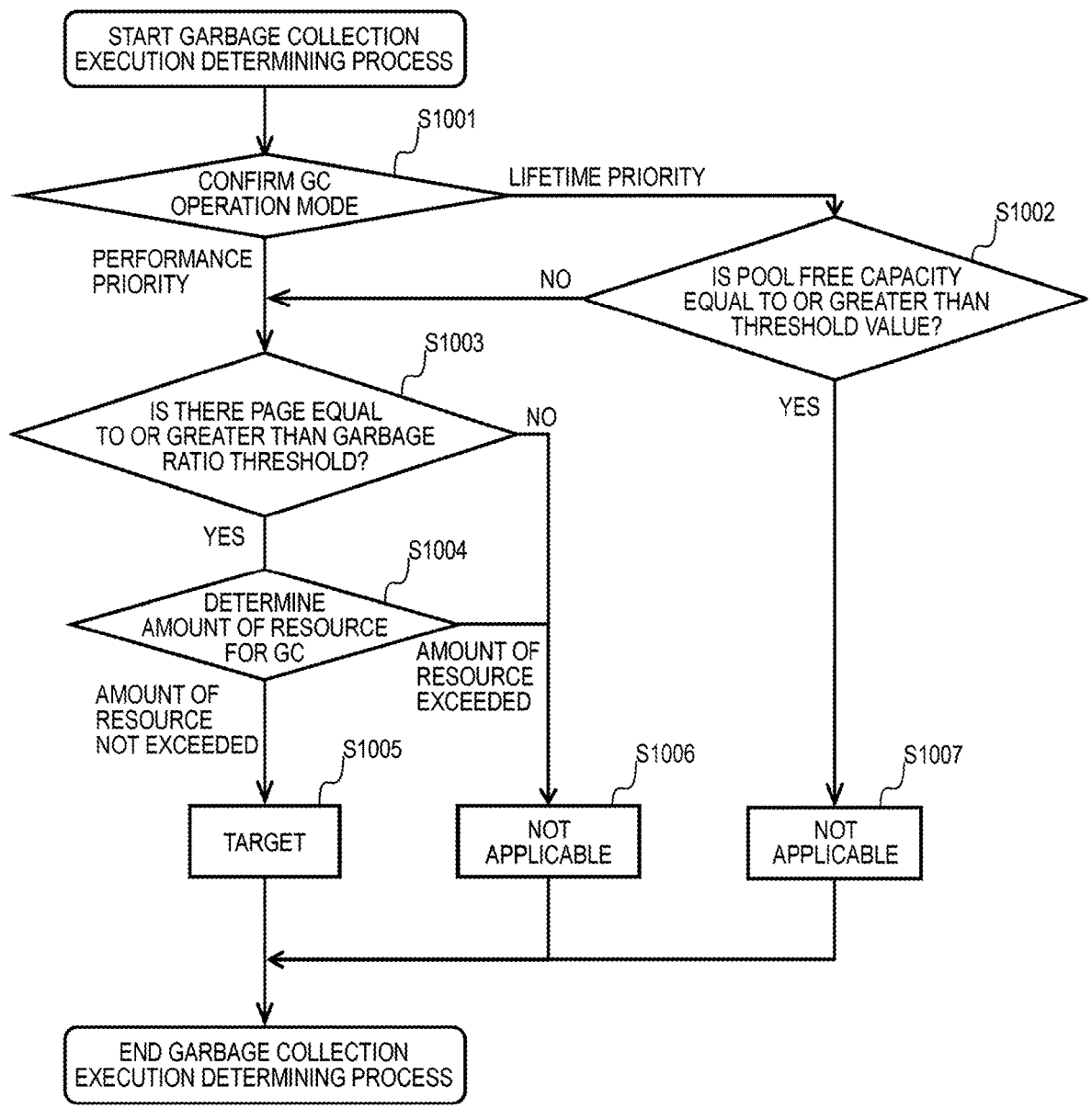
FIG. 10 is a view showing a garbage collection execution determining process according to an embodiment.

FIG. 10 is a view showing a flow of a garbage collection execution determining process according to an embodiment. The garbage collection execution determining process is a process of determining whether to execute the garbage collection process for each pool 60 in the storage system 100.

The garbage collection execution determining process may be performed periodically by the CPU 24, or may be performed synchronously or asynchronously with the write process in response to the increasing the amount of garbage in the pool 60 or the page 70 by a certain amount by the write process.

Further, the garbage collection execution determining process may be performed when the logical configuration in the storage system 100 is changed. For example, the garbage collection execution determining process may be implemented when the size of the LUN 50, LDEV, the pool 60, or RAID group 80 is changed. Further, the garbage collection execution determining process may be implemented when the physical configuration in the storage system 100 is changed. For example, the garbage collection execution determining process may be implemented in the case of addition or reduction of the drive 29.

Hereinbelow, a flow of the garbage collection execution determining process according to an embodiment will be described by referring to FIG. 10.

S1001: the CPU 24 obtains a GC operation mode of the target pool 60 by referring to the pool management table 205. The CPU 24 moves to S1002 when the GC operation mode is "lifetime priority". When the GC operation mode is "performance priority," the CPU 24 moves to S1003.

According to this embodiment, when the GC operation mode is "performance priority," the GC is executed regardless of the free capacity of the target pool 60, and therefore, when the GC operation mode is "performance priority," the CPU 24 may directly move to S1003.

It is possible to implement the equivalent operation by shifting to S1002 regardless of the GC operation mode, and properly using the pool threshold according to the GC operation mode at S1002. For example, if GC operation mode is "performance priority," it is possible to implement the equivalent operation by shifting from S1002 to S1003 regardless of the free capacity of the target pool 60, by using a value greater than the capacity of the target pool 60 (e.g., infinite amount) as the pool threshold.

S1002: the CPU 24 obtains the pool capacity and the pool used capacity of the target pool 60 by referring to the pool management table 205 and calculates the pool free capacity based on the difference between the pool capacity and the pool used capacity. When the pool free capacity is equal to or greater than the pool threshold, the CPU 24 moves to S1007. Otherwise, the CPU 24 moves to S1003.

The pool threshold may be designed based on a garbage collection processing speed (pool free capacity that may be generated per unit time by the garbage collection process) and the lifetime of the drive. As the pool threshold increases, the pool free capacity increases and the pool is less likely to run out. The more free capacity is maintained in the pool, the more processing resources, which can be devoted to I/O processing, can be increased relatively, but as the amount of data rewritten by the garbage collection process increases, the lifetime of the drive can be easily consumed.

S1003: the CPU 24 performs the following determination (X1) while targeting all of pages 70 corresponding to the target pool 60 by referring to the page management table 203.

(X1) The amount of garbage in the target page 70 is equal to or greater than a threshold of the page-by-page garbage amount.

If there are one or more pages 70 whose result of determination (X1) is affirmative among the target pages 70, the CPU 24 moves to S1004. Otherwise, the CPU 24 moves to S1006. Note that the different thresholds of the garbage amount may be set for different operation modes.

S1004: the CPU 24 determines the amount of computational resources of the CPU 24 to be allocated to the garbage collection process. The CPU 24 performs S1005 when the amount of computational resources of the CPU 24 already allocated to the garbage collection process is not reached to the target value. Otherwise, the CPU 24 moves to S1006.

For example, the "amount of computational resources" is expressed by an availability of the CPU 24 (a ratio of the operation time of the CPU 24 compared to the total time). A target value of the amount of computational resources allocated to the garbage collection process is varied according to the pool free capacity. This is because it is necessary to increase the garbage collection process speed as the free capacity decreases, in order to prevent the pool capacity from being exhausted.

The amount of computational resources allocated to the garbage collection process may be controlled, for example, through a multiplicity of the garbage collection process (a number of parallel executions). In this case, the amount of computational resources increases in proportion to the multiplicity.

The "target value of the amount of computational resources" may be calculated by setting such that, for example, with respect to a certain range R of pool capacities, the target value of the amount of computational resources is maximum at the lower limit of the range R, and minimum at the upper limit of the range R, and then the target value of the computational resources between the upper limit and the lower limit of the range R is in a linear shape. When the pool capacity is out of the range R, the target value of the computational resources may be taken from the nearest value in the range R.

S1005: the CPU 24 determines that the target pool 60 is the target of executing garbage collection, and ends the process.

S1006 and S1007: the CPU 24 determines that the target pool 60 is not the target of executing the garbage collection, and ends the process.

As described above, according to the first embodiment of the invention, depending on the type of the drives belonging to the storage system, the operation to protect the lifetime of the drives and the operation to emphasize I/O performance can be selectively used.

Second Embodiment

A second embodiment will be described below. Specifically, difference from the first embodiment will be mainly explained, and components or operations similar to the first embodiment will be omitted or simplified (a third embodiment will be described below in the same manner). In the first embodiment, the CPU 24 determines the GC operation mode of each pool in the storage system based on the type of the drives forming the pool. In the second embodiment, an administrator of the storage system 100 may set the GC operation mode of each pool.

<Operation Mode Selection Screen>

Figure 11:
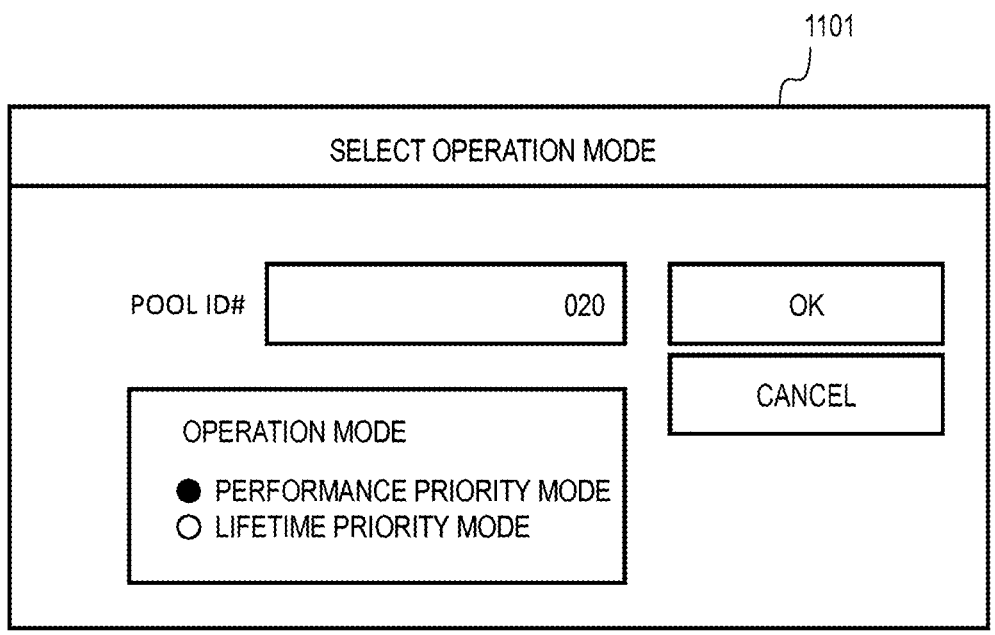
FIG. 11 is a view showing an operation mode selection screen according to an embodiment.

FIG. 11 is a view showing an operation mode selection screen 1101. The screen 1101 is provided for an input of operation mode of the garbage collection from the management computer 42. On the screen 1101, user of the management computer 42 designates a pool ID and a GC operation mode for the target pool 60.

In this embodiment, there are two types of GC operation modes, which are "performance priority" and "lifetime priority". The CPU 24 records the GC operation mode for the pool ID, which is designated by the management computer 42 through the screen 1101, at the entry in the pool management table 205.

The second embodiment has been described above. According to the second embodiment, the administrator of the storage system may selectively use a storage system operation that prioritizes the lifetime of the drives and a storage system operation that prioritizes the performance and uses the selected operation, based on the requirements of lifetime of the drives or I/O performance.

Although the GC operation mode is designated in units of the pool 60 on the operation mode selection screen (see FIG. 11) in this embodiment, the mode may be designated in units of RAID group. This enables to set the mode from a point of view other than the pool. In this case, the CPU 24 may record information of the GC operation mode designated in units of the drive 29 in the RAID configuration management table 204 instead of the pool management table 205.

For example, when the GC operation mode is designated for the RAID group including drives 29 with drive IDs 0 to 3, the CPU 24 may record the GC operation mode in a new column holding the GC operation mode for the entry of RAID group 80 (in the example of FIG. 6, RAID group with RAID group ID of 20). In this case, for GC operation mode confirmation at S1001 in the garbage collection execution determining process (see FIG. 10), the RAID configuration management table 204, instead of the pool management table 205, is referred and the GC operation mode is obtained from the entry of the corresponding RAID group.

Third Embodiment

A third embodiment will be described below. According to the third embodiment of the invention, the operation mode selection screen (see FIG. 11) is displayed on the management computer 42 to receive input of the GC operation mode for the pool ID. In this embodiment, "performance priority," "lifetime priority," and "balanced" may be designated as the GC operation mode ("balanced" is not described in FIG. 11). The GC operation mode "balanced" in this embodiment is an operation mode that dynamically controls execution of garbage collection according to lifetime of the drives forming the pool.

<Operation Mode Selection Screen>

FIG. 11 is a view showing an operation mode selection screen 1101. The screen 1101 is provided for an input of operation mode of the garbage collection from the management computer 42. On the screen 1101, user of the management computer 42 designates a pool ID and a GC operation mode for the target pool 60.

In this embodiment, there are three types of GC operation modes, which are "performance priority", "lifetime priority", and "balanced". The CPU 24 records the GC operation mode for the pool ID, which is designated by the management computer 42 through the screen 1101, at the entry in the pool management table 205.

<Drive State Determination>

FIG. 12 is a view showing a flow of a drive state determining process according to the embodiment. The drive state determining process is a process that may be performed by the CPU 24 for determining a control method of the garbage collection process on the pool based on the state of the drives forming the pool with respect to each pool defined in the storage system. The drive state determining process may be performed periodically or synchronously with the garbage collection process.

Hereinbelow, a flow of a drive state determining process according to the embodiment will be described by referring to FIG. 12. The drive state determining process is performed at S1003 of the garbage collection execution determining process shown in FIG. 10 for the pool in the balanced mode (third operation mode).

S1201: the CPU 24 obtains list information of the drives 29 corresponding to the target pool 60 by referring to the pool management table 205 and the RAID configuration management table 204.

S1202: the CPU 24 obtains monitoring data in the drives 29 with respect to each drive 29 in the list information of the drives 29 obtained at S1201. The monitoring data is data suggesting lifetime information of the drives 29, e.g., information on the total amount of data that can be written to the drive 29 and information on the total amount of data that is already written to the drive 29.

As an example of the monitoring data described above, there are Self-Monitoring Analysis and Reporting Technology (S.M.A.R.T.) information and so on which are provided by SSD.

S1203: the CPU 24 predicts remaining lifetime (available time left) of each drive 29 based on the monitoring data of each drive 29 obtained at S1202. The method for predicting the remaining lifetime of the drive in the storage system is well known, which will not be further described.

S1204: the CPU 24 determines a threshold of the amount of garbage per page. A threshold of the amount of garbage per page may be determined based on various factors, but in this embodiment, determination may be based on following factors:

(E1) remaining lifetime of the drive which is a basis of the target pool;

(E2) speed of writes to the drive which is a basis of the target pool; and (E3) write amplification factor for "threshold of the amount of garbage per page".

For numbers with respect to these drives, average values of the drives allocated to the pool can be used, for example.

For example, as a threshold of the amount of garbage per page, a high value of the amount of garbage per page as possible may be set within a range which satisfies a pre-designated lifetime (e.g., time when the warranty period from the installation expires) for the remaining lifetime of the target drive based on a value obtained by multiplying an element (E2) with an element (E3) as a coefficient (drive writing speed after correction with the threshold). The write amplification factor is an index indicating amplification degree of amount of write data to the drive with respect to the amount of write data from the host computer to the storage system. The future write amount is predicted based on the write speed and write amplification factor, and therefore, remaining lifetime of the drive is predicted.

For example, the element (E3) may be empirically determined as follows. For example, when the storage system is in operation, the host computer records the amount of write data to LDEVs linked to each pool from the host computer and the amount of write data to the drives linked to each pool, and calculates a write amplification factor. By combining the write amplification factor obtained as described above and the "threshold of the amount of garbage per page" applied during the corresponding operation period, the write amplification factor for the "threshold of the amount of garbage per page" may be calculated. This may be calculated periodically, and the results may be recorded in the memory at S1204.

The lower the "threshold for the amount of garbage per page" becomes, the more frequently the garbage collection process is performed, so that the amount of write data of the drive increases and the write amplification factor increases. Further, instead of the threshold of the amount of garbage per page, the threshold of a ratio of garbage per page may be used. The "ratio of garbage per page" is a ratio of the size of the area occupied by garbage with respect to an entire area within one page.

The flow of the drive state determining process according to the embodiment has been described above. When the CPU 24 performs a garbage collection execution determining process (see FIG. 10) for the pool whose the GC operation mode is "balanced," the CPU 24 at S1003 refers to the threshold of the amount of garbage set in the drive state determining process, and determines the pool as the target of executing the garbage collection when there is a page whose the amount is equal to or greater than the garbage amount threshold. At S1001, the CPU 24 may determine the balanced mode in the same manner as the performance priority mode, for example.

Accordingly, when the remaining lifetime of the drive is short, consumption of lifetime of the drive can be prevented by reducing frequency of performing a garbage collection process for the drive. Meanwhile, when the remaining lifetime of the drive is sufficiently long, the garbage collection process is actively performed for the drive to secure a large amount of free area. As a result, when there are increased loads of I/O requests to the storage system, more system resources can be allocated to the I/O process, thereby enhancing the I/O performance.

As described above, according to the third embodiment, the storage system can autonomously control the operations of the garbage collection based on the lifetime of the drives. Therefore, a storage system with high I/O performance can be implemented by actively performing garbage collection within a range in which the degree of consumption of the lifetime of the drive can be kept to be constant.

According to the embodiment described above, the balanced mode may be designated by a user. In another example, the CPU 24 changes the GC operation mode from the lifetime priority mode to the balanced mode when a predicted value of remaining lifetime of the drive in the lifetime priority mode exceeds the designated lifetime of the drive and the difference exceeds a threshold value.

Note that the present invention is not limited to the embodiments described above, and includes various modifications. For example, the embodiments described above are described in detail in order to explain the present invention in an easy-to-understand manner, and are not necessarily limited to those having all the configurations described above. Further, a part of a configuration of an embodiment may be replaced with a configuration of another embodiment, and the configuration of another embodiment may be added to the configuration of an embodiment. In addition, it is possible to add, delete, and replace other configurations for a part of the configuration of each embodiment.

Each of the configurations, functions, processing units, and the like described above may be realized by hardware by designing a part or all of those with, for example, an integrated circuit. Each of the configurations, functions, and the like described above may be realized by software by interpreting and executing a program that realizes each function by the processor. Information such as a program, a table, a file, and the like that realizes each function may be stored in a recording device such as a memory, a hard disk, or a solid state drive (SSD), or a recording medium such as an IC card, or an SD card.

Further, the control lines and the information lines show those considered to be necessary for explanation, and it is not necessarily limited that all the control lines and information lines are shown necessarily on the product. In practice, it may be considered that almost all components are connected to each other.

What is claimed is:

1. A storage device that manages data stored in a storage drive in a plurality of logical hierarchies, comprising:
   a host interface for communicating with a host; and
   a processor,
   wherein the plurality of logical hierarchies include an append hierarchy,
   the processor is configured to:
   write user data received in the append hierarchy through the host interface to a free area where data can be written; and
   select a garbage collection operation mode for a first logical area in the append hierarchy from a plurality of operation modes including a first operation mode and a second operation mode,
   conditions of executing the garbage collection in the first operation mode include a capacity of the free area in the append hierarchy being less than a threshold; and an amount of garbage that is invalid data after update in the first logical area being equal to or greater than a threshold,
   conditions of executing the garbage collection in the second operation mode include the amount of garbage in the first logical area being equal to or greater than a threshold value, while excluding the condition of the capacity of the free area in the append hierarchy, and
   the garbage collection selects valid data before update from the first logical area, and copies the selected valid data to another logical area in the append hierarchy, freeing up the first logical area.

2. The storage device of claim 1,
   wherein the processor selects the garbage collection operation mode according to endurance determined based on specifications of a storage drive that provides the first logical area.

3. The storage device of claim 2,
   wherein the processor determines the endurance of the storage drive that provides the first logical area based on a total data amount that can be written to the storage drive.

4. The storage device of claim 1,
   wherein the processor adjusts processing resources of the processor allocated to the garbage collection based on the capacity of the free area of the append hierarchy.

5. The storage device of claim 1,
   wherein the processor selects the garbage collection operation mode according to a designation from an external device.

6. The storage device of claim 5,
   wherein the processor receives the designation from the external device for each append hierarchy included in the plurality of logical hierarchies.

7. The storage device of claim 5,
   wherein the processor receives the designation from the external device for each RAID group of the storage drive.

8. The storage device of claim 1,
   wherein the plurality of operation modes include a third operation mode, and
   the processor in the third operation mode determines a threshold of the amount of garbage in the first logical area based on a remaining lifetime of a storage drive that provides the first logical area.

9. The storage device of claim 8,
   wherein the remaining lifetime is determined based on an amount of data written to the storage drive and a total amount of data that can be written to the storage drive.

10. A method for controlling garbage collection in a storage device, the storage device managing data stored in the storage drive in a plurality of logical hierarchies, the plurality of logical hierarchies including an append hierarchy, the method comprising:
    writing, by the storage device, user data received in the append hierarchy to a free area where data can be written;
    and selecting, by the storage device, a garbage collection operation mode for a first logical area in the append hierarchy from either a first operation mode or a second operation mode of
    a plurality of operation modes,
    wherein conditions of executing the garbage collection in the first operation mode include a capacity of the free area in the append hierarchy being less than a threshold; and an amount of garbage that is invalid data after update in the first logical area being equal to or greater than a threshold,
    conditions of performing garbage collection in the second operation mode include the amount of garbage in the first logical area being equal to or greater than a threshold value, while excluding the condition of the capacity of the free area in the append hierarchy,
    and the garbage collection selects valid data before update from the first logical area, and copies the selected valid data to another logical area in the append hierarchy, freeing up the first logical area.

* * * * *